United States Patent
Hoblit (10) Patent No.: US 8,164,801 B2
(45) Date of Patent: Apr. 24, 2012

(54) PROVIDING UPDATED VERSIONS OF PRINTED DOCUMENTS FROM TWO-DIMENSIONAL BARCODES ASSOCIATED WITH THE UPDATED VERSIONS

(75) Inventor: Robert S. Hoblit, Raleigh, NC (US)

(73) Assignee: International Buisness Machines Corporation, Armonk, NJ (US)

( * ) Notice: Subject to any disclaimer, the term of this patent is extended or adjusted under 35 U.S.C. 154(b) by 857 days.

(21) Appl. No.: 12/252,979

(22) Filed: Oct. 16, 2008

(65) Prior Publication Data

US 2010/0097661 A1 Apr. 22, 2010

(51) Int. Cl.
H04N 1/04 (2006.01)

(52) U.S. Cl. ....... 358/403; 358/505; 358/1.15; 358/1.16

(58) Field of Classification Search .................. 358/403, 358/505, 1.15, 1.16, 1.18
See application file for complete search history.

(56) References Cited

U.S. PATENT DOCUMENTS

| | | | |
|---|---|---|---|
| 6,304,335 B1 | 10/2001 | Furuya et al. | |
| 7,537,162 B1 * | 5/2009 | Siu | 235/462.01 |
| 7,628,318 B2 * | 12/2009 | Melick et al. | 235/375 |
| 7,826,101 B2 * | 11/2010 | Yano et al. | 358/403 |
| 7,934,641 B2 * | 5/2011 | Melick et al. | 235/375 |
| 2003/0107759 A1 | 6/2003 | Athens et al. | |
| 2005/0131718 A1 | 6/2005 | Campagna et al. | |
| 2006/0129313 A1 | 6/2006 | Becker et al. | |
| 2006/0212410 A1 | 9/2006 | Tokarski et al. | |
| 2007/0067104 A1 | 3/2007 | Mays | |
| 2007/0176001 A1 | 8/2007 | Cattrone et al. | |
| 2007/0177824 A1 | 8/2007 | Cattrone et al. | |
| 2007/0271030 A1 | 11/2007 | Deurwaarder | |
| 2008/0037730 A1 | 2/2008 | Cubillo | |
| 2008/0081666 A1 | 4/2008 | Masera et al. | |

* cited by examiner

Primary Examiner — Houshang Safaipour
(74) Attorney, Agent, or Firm — Julius B. Kraft; Thomas E. Tyson (57) ABSTRACT

Providing an updated version of a printed document comprising storing data for generating an original version of a printed document, including a two-dimensional barcode that contains: data identifying the original version of the document, as well as at least a portion of the data for generating the original version of the document. The invention also enables the updating of the stored data so that a later version of the printed document may be generated including a new barcode for identifying and generating the later version. The barcode of a version of the document is scanned to determine if the scanned barcode identifies the later version of the document. If the barcode does not identify the later version, then the later version of the document is generated and printed. If the barcode does identify that the scanned document is the later version, the document is not printed and the user may be notified that the scanned version is the latest version.

20 Claims, 5 Drawing Sheets

PROVIDING UPDATED VERSIONS OF PRINTED DOCUMENTS FROM TWO-DIMENSIONAL BARCODES ASSOCIATED WITH THE UPDATED VERSIONS

TECHNICAL FIELD

The present invention relates to printing terminals for providing users with the latest versions of printed documents, particularly printed documents, the versions of that are regularly upgraded; such as transportation schedules, road maps, fill-out forms, as well as technical and business reports.

BACKGROUND OF RELATED ART

The past generation has been marked by a rapid expansion of communication, as well as the distribution and marketing of goods and services over extensive communication networks, such as the Internet or World Wide Web (terms are used interchangeably herein).

This expansion has produced a need for greater documentation, i.e. printed documents. The expansion of the communication facilities has greatly increased the distribution of work and, thus, the number of people who are available and involved in workflow of technical, production and business operations. In order to coordinate these activities, printed documentation must be available.

In this connection, original visions of a paperless society in which electronic documentation replaces printed paper documents is fading. Actually, the Internet revolution has greatly increased the consumption of paper to the point that dire environmental consequences are looming. These conditions have forced all industries and environments that generate a substantial amount of printed documents to seek implementations for reducing the amount of paper consumed by the necessary printed documentation.

The present invention provides an implementation to reduce paper consumption that would be wasted in the printing of documents that have one or more updated document versions. In commerce and industry there are many printed documents regularly updated over relatively short time periods that are, at times, almost daily. Such printed documents include transportation schedules, e.g. bus, train, airline schedules and road maps generated by such services as AAA™ and other trip planner services that may have to be upgraded over short time periods to account for road closures and detours due to construction, as well as technical and business reports that coordinate the progress of joint project activities. There is clearly a need for such printed documents to reduce inventories of outdated or older versions of documents that are eventually destroyed. It would be desirable to have an implementation wherein updated or upgraded versions of such documents are printed only to meet user needs.

SUMMARY OF THE PRESENT INVENTION

The present invention provides an implementation that minimizes inventories of outdated versions of printed documents and enables the determination and printing of only the latest versions of updated documents. The claimed invention provides a computer controlled scanning and printing system, method and computer program for providing an updated version of a printed document, comprising storing data for generating an original version of a printed document including a two-dimensional barcode that contains: data identifying the original version of the document, as wall as at least a portion of the data for generating the original version of the document. The invention also enables the updating of the stored data so that a later version of the printed document may be generated including a new barcode for identifying and generating the later version. According to the invention, the barcode of a version of the document is scanned to determine if the scanned barcode identifies the later version of the document. If the barcode does not identify the later version, then the later version of the document is generated and printed. Of course, if the barcode does identify that the scanned document is the later version, the document is not printed and the user may be notified that the scanned version is the later version.

The present invention, as set forth above, may be used to determine whether a version of a document being scanned is the latest version of any transportation schedules, e.g. bus, train, airline schedules, as well as technical and business reports that coordinate the progress of joint project activities. In addition, the claimed invention may be more specifically used for maps provided by motor vehicle travel services that provide printed documents, e.g. route maps showing the optimum route between at least two selected geographical points that may be entered by the traveler.

As will be hereinafter described in greater detail, the use of two-dimensional barcodes with their relatively high data storage capacity enables the barcode to contain not only the stored data necessary to identify the version of the document, but also data from which all or a portion of the version of the document itself may be generated.

A more particular aspect of the present invention that may be provided by transportation services may include storing data related to a plurality of geographical attributes defining travel conditions between two selected points, determining the optimum travel route between the two selected points based upon the plurality of geographical attributes, associating the optimum travel route with the printed barcode identifying the original version of route map and storing the data representing the optimum travel route as the original version of the route map.

An additional aspect of the claimed invention may involve updating the stored data related to the geographical attributes, wherein the determined optimum travel route is updated and further includes associating the updated optimum travel route with the printed barcode identifying the later version of the route map and storing the data representing the updated optimum travel route as the later version of the route map. This aspect may further include user interactive selection of the two geographical points by entering the geographical addresses of the two points.

In another aspect of the claimed invention involving mapping, where the optimum travel route is long and requires several days of travel, the implementation may further include dividing the optimum travel route into a sequence of route portions, each having a portion of a barcode identifying the original version of the portion, scanning the barcode of a version of a route portion to determine if the scanned barcode identifies the later version of the route portion and printing the later version of the route portion if the scanned barcode does not identify the later version wherein the later version is provided.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENTS

Figure 3A:
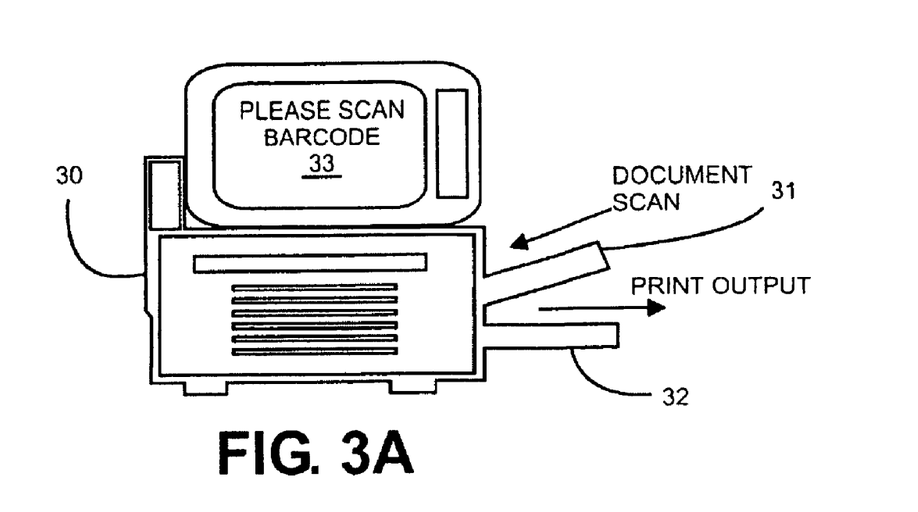
FIG. 3A is a simplified illustration of a scanner/printer kiosk, at an initial stage, in the implementation of the present invention.

Referring first to FIG. 3A, there is shown a simplified illustration of a scanner/printer kiosk 30 that may conveniently be a business center kiosk. Such kiosks are present in hotels, convenience stores, shopping malls and business centers. These kiosks provide computer controlled user-interactive scanning, printing, copying, faxing and Internet services to the occasional user. One typical business center kiosk in general usage is the KonicaMinolta C350. In the following embodiment, we have used a travel route map as the illustrative printed document that needs to be regularly updated to provide subsequent versions. Consequently, our illustrative embodiment involves scanner/printers, such as business center kiosks that would be available to travelers. However, it should be understood that this invention as claimed is intended to also be applicable to scanning of barcodes and printing of the latest versions of documents in travel schedule facilities, government and business offices providing forms to be filled out and commercial and industrial facilities issuing progress reports and technical reports, among others. In such facilities, the scanner/printers may be designed and programmed to the needs of the facility.

The scanner/printer 30, FIG. 3A, has a document input 31 in which the barcode on the document may be scanned and an output 32 for any printed document that may be produced. The barcode scanned has a conventional two-dimensional barcode format that may be used to identify the version of the document being scanned. Also, because of the relatively high data storage capacity of the two-dimensional barcode, the barcode may include all or a portion of the data needed to generate the identified document itself.

Because of the significance of two-dimensional barcodes to the present invention, some background information on two-dimensional barcodes will now be described. Two-dimensional barcodes, unlike the linear single row barcodes, contain data encoded in the horizontal and vertical dimensions. As more data is encoded, the size of the barcode may be increased in both the horizontal and vertical directions. This makes it possible to maintain a shape and size manageable for easy scanning. A standard two-dimensional barcode in the public domain, that is widely used, is a Portable Data File (PDF417), which is a stacked symbology consisting of 17 modules, each containing 4 bars and spaces. The structure allows for between 1,000 to 2,000 characters per symbol with an information density between 100 and 340 characters. Each symbol has a start and stop bar group that extends the height of the symbol. PDF417 symbols may be read with modified laser or CCD scanners. When printing PDF417 barcodes, high density laser printers are preferred.

Figure 3B:
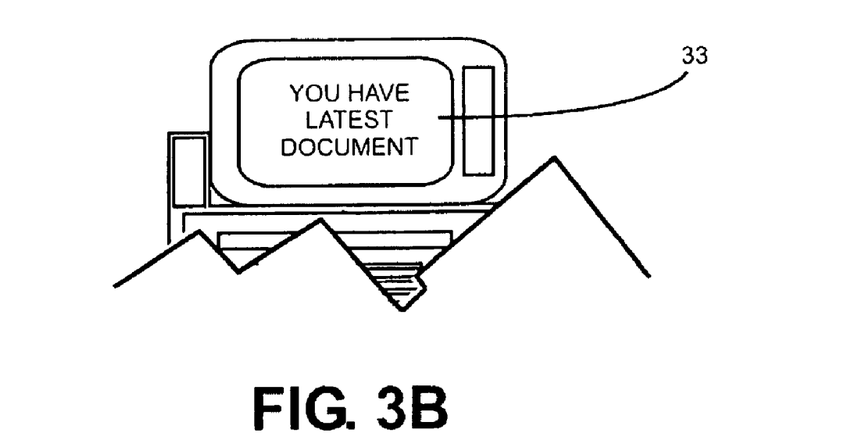
FIG. 3B is a simplified illustration of a scanner/printer kiosk, at another stage, in the implementation of the present invention.
Figure 3C:
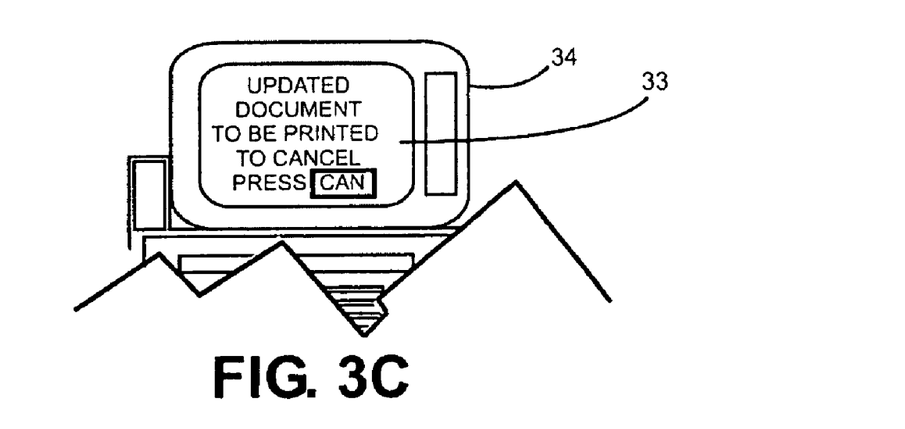
FIG. 3C is a simplified illustration of a scanner/printer kiosk, at a further stage, in the implementation of the present invention.

Initially, the user is prompted on display 33 to scan the barcode on the printed document, such as a route map. As will be hereinafter described in greater detail, the scanner/printer system communicates, e.g. via the Web with the appropriate database and determines whether the document being scanned is the latest version or whether there has been a subsequent update in data in the database so that there is a later version of the document. If there has been an updated version, its barcode will have been changed and stored in the database. In the case of the two-dimensional barcode in which at least some of the data for generating the document has been stored in the barcode, the data represented by the barcode may be compared with the data in the database to determine whether there has been an update. If a barcode comparison indicates that the scanned version is the latest version, then, FIG. 3B, the user is notified on screen 33 that the scanned document is the latest version of the document. If the version is not the latest version, then, as shown in FIG. 3C, the latest version of the document is printed while the user is given the option of canceling the printing by touching button 34.

The term "later or latest version" of a document as used herein is meant Lo include a prior version that has been changed. The latest version is not necessarily a formal version with a formal version number or designation. The change may be just a simple addition, e.g. a minor update in the document data. Thus, the barcode identification may simply indicate whether or not there has been an update. Where the update is a very simple or limited one, the printout to the user may just be an addendum to be added to a map or other document. Also, if the change involves just a portion of a document, e.g. a portion of a route map, the printed document may be a print out of a portion of the document along with instructions detailing what is to be replaced.

Figure 1:
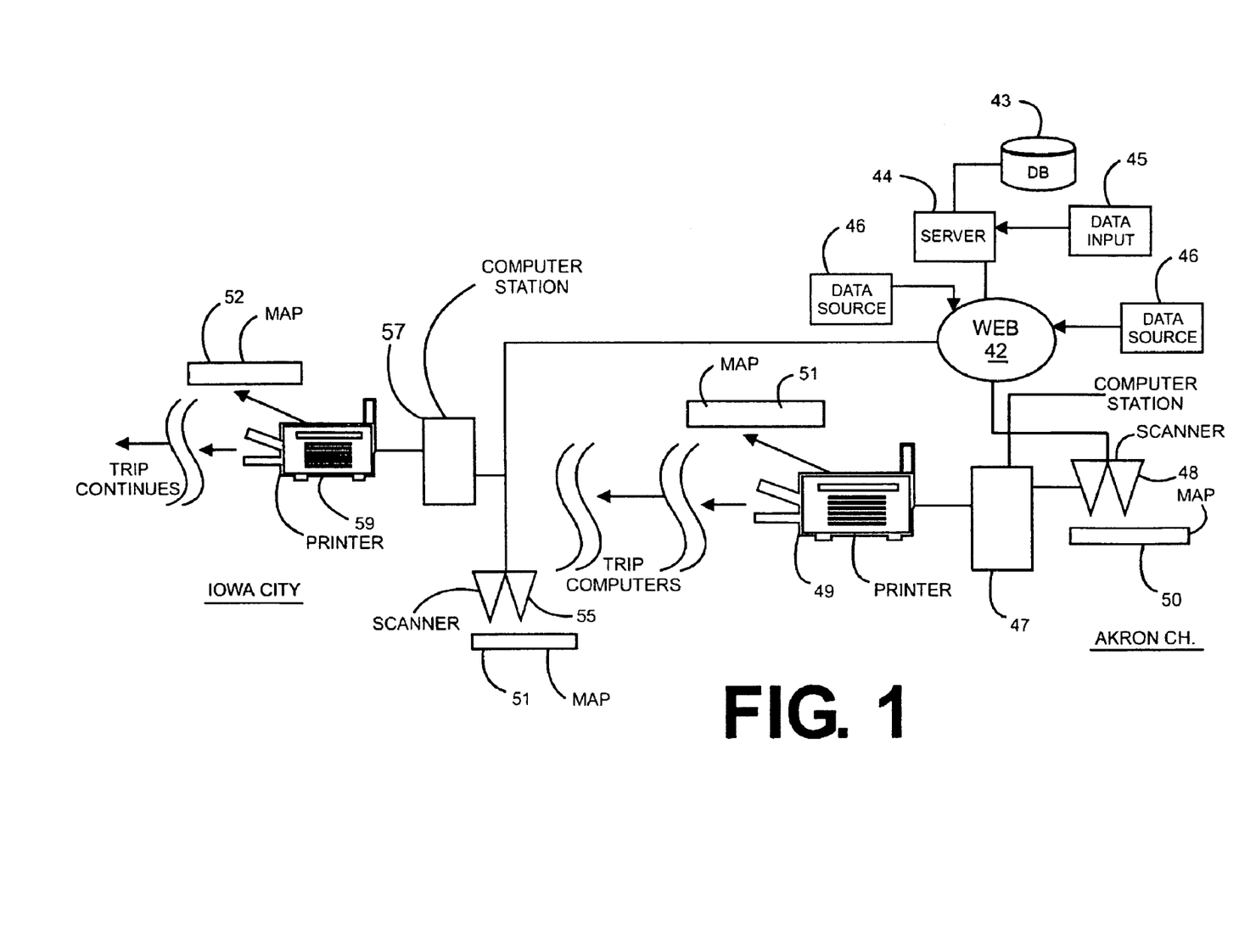
FIG. 1 is a block diagram of a generalized view of a network set up for the provision of updated versions of route maps to an exemplary vehicle operated along a planned route according to present invention.

Referring now to FIG. 1, there is shown a diagram of a generalized view of a network set up for the provision of updated versions of route maps to an exemplary vehicle operated along a planned route. A database 43 stores the data from which the latest version of the route maps, including their barcodes, may be generated. Database 43 is controlled and maintained by server 44 that coordinates the data provided from sources 46 via Web 42 or directly from source 45. These sources may provide data such as road conditions, construction, closures and traffic density that server 44, using appropriate road map generating program algorithms, coordinates to provide updated map versions. In an illustrated trip, the traveling vehicle makes stops in Akron and subsequently in Iowa City. At the first stop in Akron, the user may verify whether he has the latest version of map 50 by scanning the barcode via scanner 48 at the computer 47 controlled scanner/printer station. The read barcode is sent to database server 44 via Web 42. If the server determines that there is a later version of the map, the Later version is generated from data including data from database 43 and sent back to computer 47 via Web 42 that, in combination with any data encoded in the new document barcode, causes printer 49 to print out the later version of map 51 including the associated latest barcode. Otherwise, the user is informed that he has the latest version to continue with his trip.

At a later stop in the trip at Iowa City, once again, user may verify whether he has the latest version of map 51 by scanning the barcode via scanner 58 at the computer 57 controlled scanner/printer station. The read barcode is sent to database server 44 via Web 42. If the server determines that there is a later version of the map, the later version is generated at least in part from data database 43, and sent back to computer 57 via Web 42, and printer 59 prints out the later version, map 52, and the traveler may continue his trip.

It should be noted that while the route map display system is continually updated through Global Positioning Systems (GPS) installed in motor vehicles have been gaining usage, these systems add to the expense of the automobile and are difficult to use by many individuals. The route map may be continually updated in accordance with the present invention and should offer a less expensive and easier to use alter-native to the GPS mapping system. The present invention provides what has been a shortcoming of prior printed map systems. The printed versions of the route map may be readily and continuously upgraded to reflect changes in route conditions with a minimum consumption of paper.

It must be emphasized that with the present two-dimensional barcode document identifiers, there need not be a strict actual version of a document. All or part of the driving instructions needed to generate the route map may be encoded in the two-dimensional barcode. Thus, the two-dimensional barcode is a computer scannable representation of enough relevant data in the document to determine whether the version of the document is still valid. For example, if a document is a quarterly report for a company, then the relevant data in the barcode that would indicate whether the document is the current version could be the company Web site or URL and the end of quarter date of the document. In the case of a route map, the relevant data in the two-dimensional barcode could be a combination of the start address, end address, total distance, total expected travel time and number of steps.

In accordance with another aspect of the present invention, the user could be enabled to set up tolerance thresholds that would determine whether the current document is "good enough". In many situations, the user may not be interested in generating an updated document version where the changes from the data encoded in the two-dimensional barcode are minor. For example, continuing with the case of route maps, if a new optimal route has been determined from the database that is only slightly different from the route represented by/encoded in the barcode, and the original route is still valid, the user may be presented with a decision to print out and try the new route or not. In such a case, the user may be enabled to set up thresholds based upon the nature of the documents being generated as to whether or not he even wishes to be advised of minimal updates in the data. In such a situation, in the case of route maps, the user could predetermine a threshold of time and or distance, the difference of which would be so small that the user would consider the old route still valid.

It should be noted that with the two-dimensional barcode, as used in the present invention, a considerable quantity of text may be encoded in a relatively small amount of space in the barcode. The encoded data may be plain text or in the form of a markup language such as XML. In the case of a markup language such as XML, the text encoded in the two-dimensional barcode itself may be, in the case of a route map, a start address and an end address, followed by a sequence of instructions in XML:

```
<xml>
<startAddress>
  <Address1 = "Address Line 1">
  <Address2 = "Address Line 2">
  <City = "City">
  <State ="NM">
  <PostalCode = 12345>
</startAddress>
<route>
  <travelStep>
    <turninstruction = "Right">
      ................
      ................
      ................
      ................
    <distance = "xxx">
    <approximateDuration = "40">
  </travelStep>
      ................
      ................
```

With this information encoded in the two-dimensional barcode, the next time that the user wishes to use the route map, the barcode is scanned and the directions encoded in the barcode are compared to the updated instructions in the database via the Web. The response is whether or not there is a comparison match in response to which a new route map is printed by updating the barcode to a new pattern representative of the new map version that is then printed from the data encoded in the updated barcode.

In the above example of the present invention, the two-dimensional bar code contains all of the data needed to generate the printed document. There may be circumstances wherein the barcode contains only a portion of the data needed to generate the document, e.g. in the case of a route map, both data encoded in the barcode combined with data from the remote database may be used to generate the route map. In such a case, only the sequence of roads could be encoded in the barcode, and the rest of the data, e.g. times, distances and types of turns would be accessed from the remote database to create the printed route map. However, in the barcode comparison, if the road sequence in the barcode matches the sequence returned from the remote serving database, the route map would be valid and there would be no need for an update of the other information.

There may be circumstances wherein the serving database cannot be contacted, i.e. verification of the barcode is not possible. In such circumstances, the user should be notified of this inability to verify so that the user may then be able to decide whether or not the document may still be used.

In accordance with another aspect of this invention, it is, recognized that even with documents of which many users will print out the latest version, there are many other users who never will print out the latest versions of the document they will use. Reference is made to users who use paperless electronic documents or even book readers to review documents. With such an implementation, wherein the document is stored in PDF form, the stored graphic is read by the controlling computer to determine and interpret the barcode. Once the barcode is read by the computer, it is as if the barcode was scanned and the previously described procedure may be used in the determination of the latest version.

Figure 2:
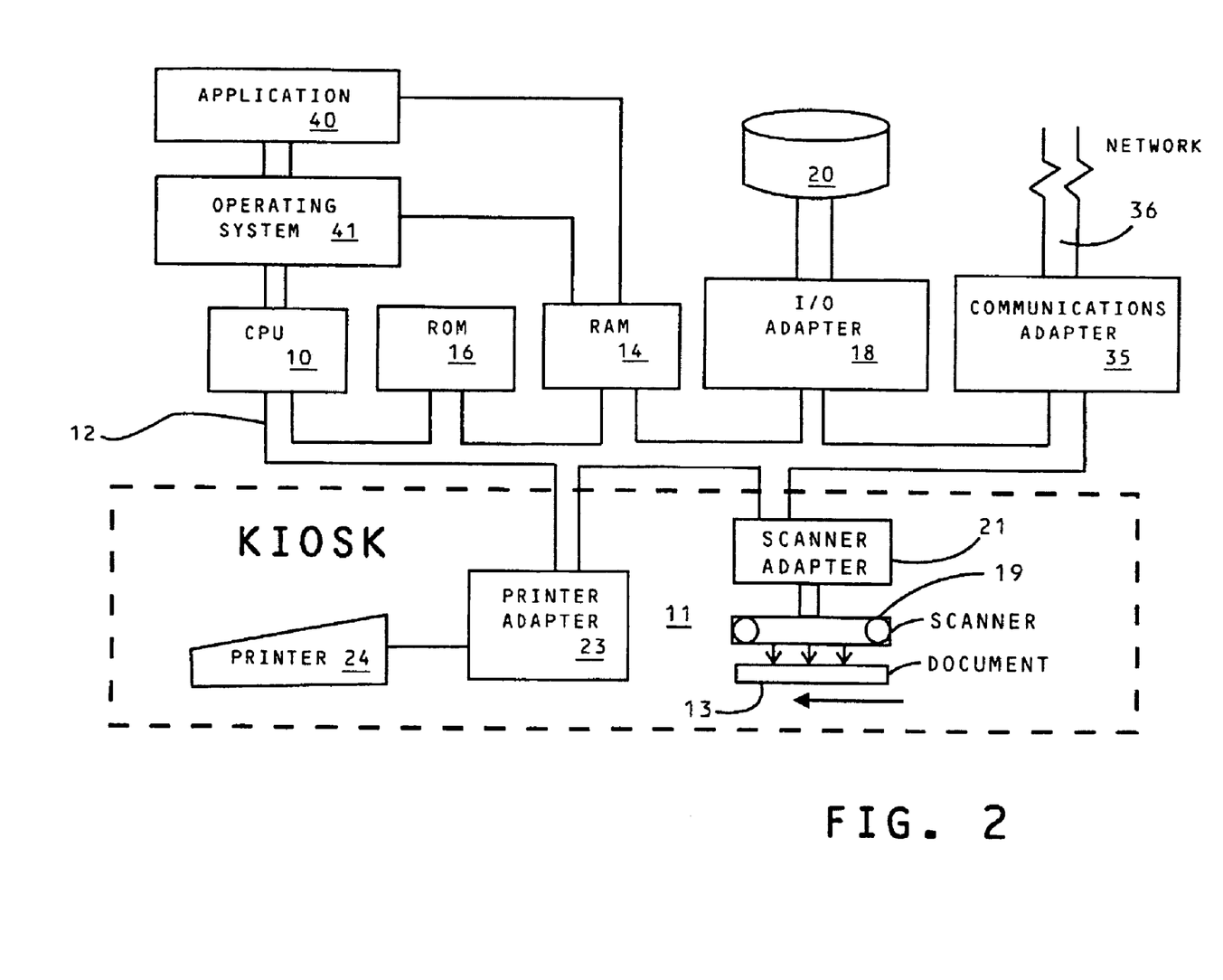
FIG. 2 is a block diagram of a basic generalized data processing system including a central processing unit (CPU) that may be used at a scanner/printer kiosk in the implementation of this invention.

Reference is now made to FIG. 2, which represents a data processing display system that may function as the computer controlled scanner/printer, e.g. scanner/printer 30, FIG. 3A, or computer stations, 47 and 57, FIG. 1, or database servers such as server 44 for database 45. A CPU 10, such as one of the conventional PC microprocessors available from Lenovo or Dell, is provided and interconnected to various other components by system bus 12. An operating system 41 runs on CPU 10, provides control and is used to coordinate the function of the various components of FIG. 1. Operating system 41 may be one of the commercially available operating systems, such as Microsoft's WindowsXP™, as well as other more specific operating systems. Application programs 40, controlled by the system, are moved into and out of the main memory: Random Access Memory (RAM) 14. These programs include the programs of the present invention for generating updated printed document versions by scanning barcodes. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20 that could either provide the storage of the database 45 where the system of FIG. 2 is used in server 44 of FIG. 1 or just local storage for a scanner/printer station 47. Communications adapter 35 interconnects bus 12 with the outside network enabling the scanner/printer stations 47 and 57, to communicate with database server 44 via the Web, as previously described. Conventional I/O devices, such as the mouse or keyboard (not shown), may also be connected to system bus 12 via appropriate adapters. Still with reference to FIG. 2, the scanning/printing is provided by scanner 19 connected to bus 12 via scanner adapter 21 that scans the barcode of the printed document 13 under control of CPU 10 running the application program 40 on operating system 41. Likewise printing is provided by printer 24 connected to bus 12 via printer adapter 23 that prints the latest version of the printed document under control of CPU 10 running the application program 40 on operating system 41.

Figure 4:
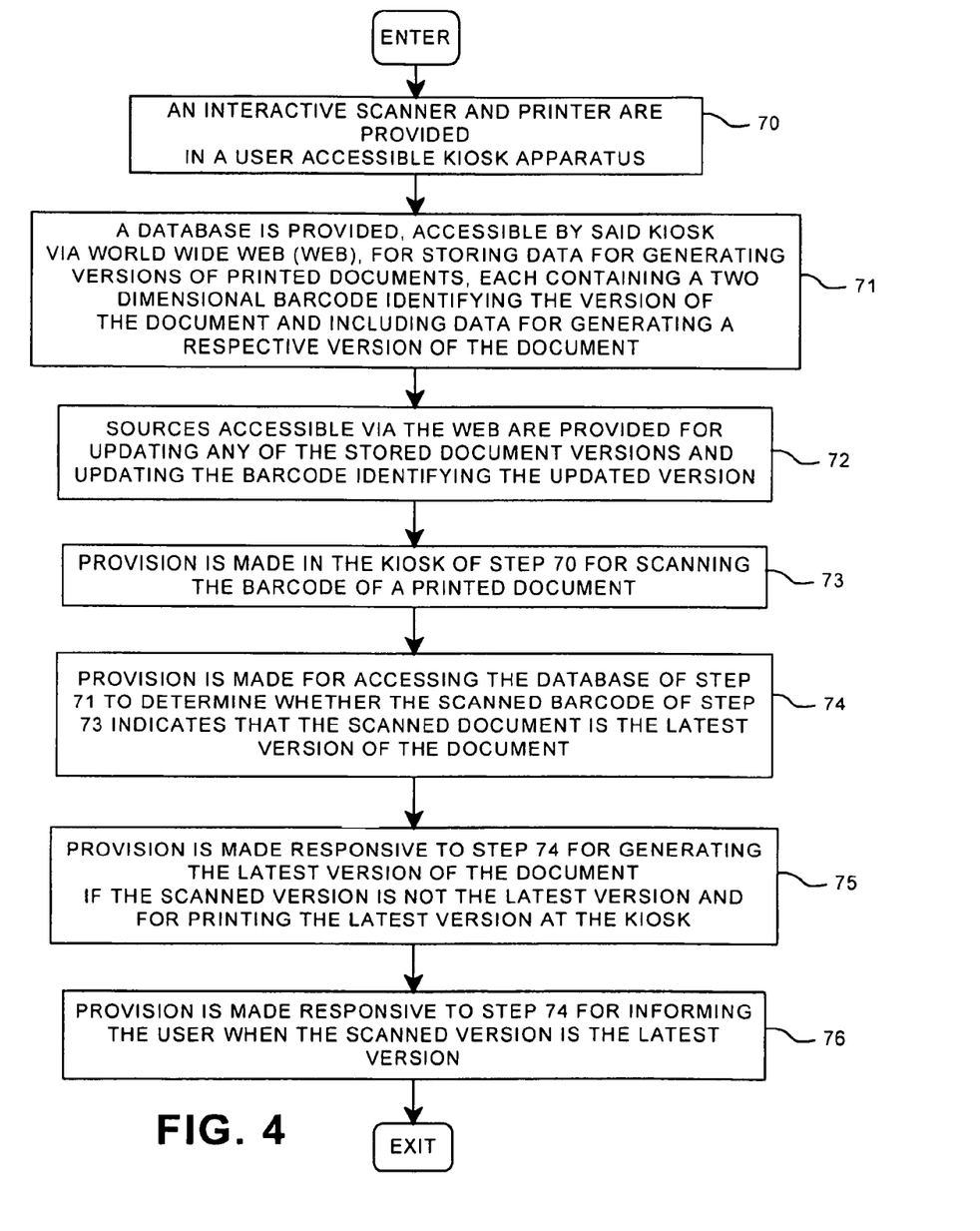
FIG. 4 is an illustrative flowchart describing the setting up of the elements of a program according to the present invention.

FIG. 4 is a flowchart showing the development of a computer program according to the present invention for providing the latest version of documents having a plurality of updated versions. An interactive scanner/printer is provided in a user accessible kiosk, step 70. A database is provided accessible by the kiosk via the Web for storing data from which versions of the printed documents may be generated, including a two-dimensional barcode identifying the version of the document, step 71. Updating the stored document version, generating data and the respective identifying barcodes from sources is provided via the Web, step 72. Provision is made in the kiosk described in step 70 for scanning the barcode of a printed document, step 73. Provision is made for accessing the database of step 71 to determine whether the scanned barcode of step 73 indicates that the scanned document is the latest version of the document, step 74. Provision is made, responsive to step 74, for accessing the data for generating the latest version of the document from the database if the scanned version is not the latest version and for generating and printing the latest version including a new two-dimensional barcode at the kiosk if the scanned version is not the latest version, step 75. Finally, step 76, provision is made, responsive to step 74, for informing the user when the scanned version is not the latest version.

Figure 5:
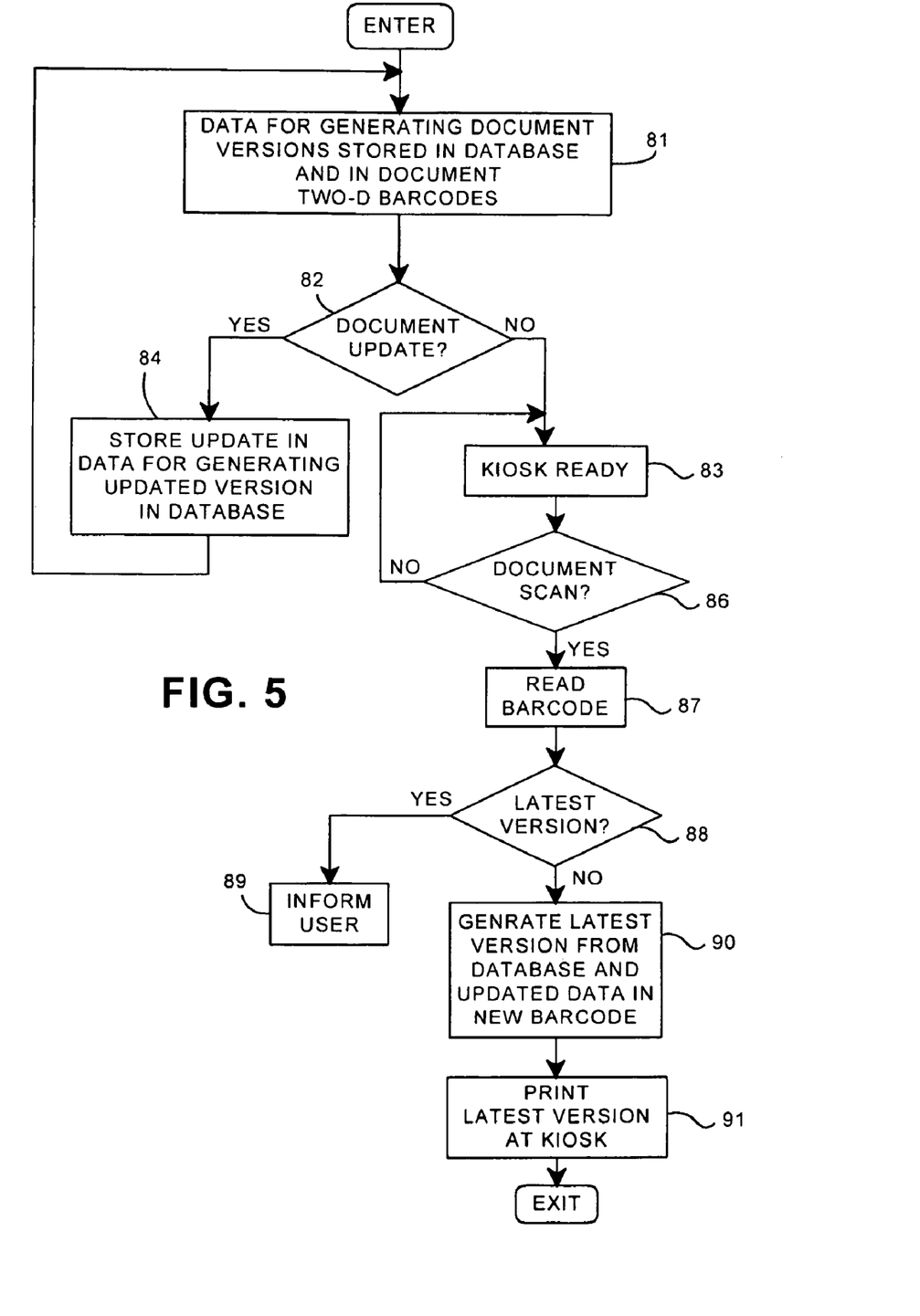
FIG. 5 is a flowchart of an illustrative run of the program set up in FIG. 4.

The running of the program set up in FIG. 4 will now be described with respect to the flowchart of FIG. 5. The data for generating document versions being updated is stored in a database that may be accessible via the Web, step 81. In step 82, a determination is made as to whether a document update is incoming. If Yes, the data for generating the document is updated and its barcode changed to indicate a new version, step 84. If No, all of the current document data for generating a document version continues to be stored in the database. The kiosks, or like scanner/printers are ready for input, step 83. A determination is continuously made as to whether there is a document input to the scanner, step 86. If Yes, its barcode is read, step 87, and a further determination is made, step 88, as to whether, the barcode of the scanned document indicates that the scanned document is the latest version. If Yes, the user is informed, step 89, so that he may continue to use the document as the latest version. If No, then the latest version of the document is generated from data accessed from the database that may be combined with some still valid data encoded in the barcode, step 90, and printed out for the user at the kiosk, step 91. A new barcode is provided in the printed document indicative of the new version of the document.

One of the implementations of the present invention may be in application program 40 made up of programming steps or instructions resident in RAM 14, FIG. 2, of the computer 47 (FIG. 1) controlling the kiosk or server 44 (FIG. 1) for the database or on both during various operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a network, such as the Web itself, when required by the user of the present invention.

One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer controlled scanning and printing system, a method of providing an updated version of a printed document comprising:
    storing data for generating an original version of a printed document including:
        a two dimensional barcode having:
            data identifying said original version of said document; and
            a portion of said data for generating said original version of said document;
    enabling the updating of said stored data wherein a later version of said printed document may be generated including a new barcode for identifying and generating said later version;
    scanning the barcode of a version of said document to determine if the scanned barcode identifies the later version of the document, and
    generating and printing the later version of said document if the scanned barcode does not identify the later version.

2. The method of claim 1 further including notifying a user when the scanned barcode does identify the later version of the document.

3. The method of claim 2 wherein:
    said printed document is a route map showing the optimum route between at least two selected geographical points.

4. The method of claim 3 wherein at least a portion of the stored data for generating said printed later version of said document is stored in the two-dimensional barcode identifying said later version.

5. The method of claim 4 further including:
storing data related to a plurality of geographical attributes defining travel conditions between two selected points;
determining the optimum travel route between said two selected points based upon said plurality of geographical attributes;
associating said optimum travel route with said barcode identifying said original version of route map; and
storing the data representing said optimum travel route as the data for generating said original version of said route map.

6. The method of claim 5 wherein said enabling said updating enables the updating of said stored data related to said geographical attributes, wherein said determined optimum travel route is updated; and further including:
associating said updated optimum travel route with said barcode identifying said later version of route map; and
storing the data for representing said updated optimum travel route as the data for generating said later version of the route map.

7. The method of claim 6 wherein all of the data needed to generate said later version of the travel route is stored in the two-dimensional barcode identifying said later version.

8. The method of claim 7 further including user interactive selection of said two geographical points by entering the geographical addresses of said two points.

9. The method of claim 8 wherein said optimum travel route is long and requires several days of travel, and further including:
dividing the optimum travel route into a sequence of route portions, each having portion barcode identifying the original version of the portion;
scanning the barcode of a version of a route portion to determine if the scanned barcode identifies the later version of the route portion, and
printing the later version of the route portion if the scanned barcode does not identify the later version wherein the later version is provided.

10. A computer controlled user interactive scanning and printing system for providing an updated version of a printed document comprising:
a database for storing data for generating an original version of a printed document including:
a two dimensional barcode having:
data identifying said original version of said document; and
a portion of said data for generating said original version of said document;
apparatus enabling the updating of said stored data wherein a later version of said printed document may be generated including a new barcode for identifying and generating said later version;
apparatus for scanning the barcode of a version of said document to determine if the scanned barcode identifies the later version of the document, and
apparatus for generating and printing the later version of said document if the scanned barcode does not identify the later version.

11. The scanning and printing system of claim 10 further including apparatus for notifying a user when the scanned barcode does identify the later version of the document.

12. A non-transitory computer usable medium having stored thereon, a computer program for providing an updated version of a printed document in a computer controlled scanning and printing system, wherein the computer program when executed on a computer causes the computer to:
store data for generating an original version of a printed document including:
a two dimensional barcode having:
data identifying said original version of said document; and
a portion of said data for generating said original version of said document;
enable the updating of said stored data wherein a later version of said printed document may be generated including a new barcode for identifying and generating said later version;
scan the barcode of a version of said document to determine if the scanned barcode identifies the later version of the document, and
generate and print the later version of said document if the scanned barcode does not identify the later version.

13. The non-transitory computer usable medium of claim 12 wherein said computer program when executed further causes the computer to notify a user when the scanned barcode indicates that the scanned version of the document is the later version.

14. The non-transitory computer usable medium of claim 13 wherein:
said printed document is a route map showing the optimum route between at least two selected geographical points.

15. The non-transitory computer usable medium of claim 14, wherein at least a portion of the stored data for generating said printed later version of said document is stored in the two-dimensional barcode identifying said later version.

16. The non-transitory computer usable medium of claim 15, wherein said computer program when executed further causes the computer to:
store data related to a plurality of geographical attributes defining travel conditions between two selected points;
determine the optimum travel route between said two selected points based upon said plurality of geographical attributes;
associate said optimum travel route with said barcode identifying said original version of route map; and
store the data representing said optimum travel route as the data for generating said original version of said route map.

17. The non-transitory computer usable medium of claim 16, wherein said computer program when executed on a computer enables said updating by enabling the updating of said stored data related to said geographical attributes, wherein said determined optimum travel route is updated; and further causes the computer to:
associate said updated optimum travel route with said barcode identifying said later version of route map; and
store the data representing said updated optimum travel route as the data for generating said later version of said route map.

18. The non-transitory computer usable medium of claim 17, wherein all of the data needed to generate said later version of the travel route is stored in the two-dimensional barcode identifying said later version.

19. The non-transitory computer usable medium of claim 18, wherein said computer program when executed, further enables user interactive selection of said two geographical points by entering the geographical addresses of said two points.

20. The non-transitory computer usable medium of claim 19, wherein said optimum travel route is long and requires several days of travel, and the computer program when executed on a computer further causes the computer to:

divide the optimum travel route into a sequence of route portions, each having portion barcode identifying the original version of the portion;

scan the barcode of a version of a route portion to determine if the scanned barcode identifies the later version of the route portion, and print the later version of the route portion if the scanned barcode does not identify the later version wherein the later version is provided.

* * * * *